United States Patent

[11] 3,607,932

[72] Inventor Peter Dimroth
 Ludwigshafen, Germany
[21] Appl. No. 853,494
[22] Filed Aug. 27, 1969
[45] Patented Sept. 21, 1971
[73] Assignee Badische Anilin- & Soda-Fabrik
 Aktiengesellschaft
 Ludwigshafen am Rhine, Germany
[32] Priority Sept. 9, 1968
[33] Germany
[31] P 17 94 105.8

[54] BLACK PIGMENT DYES OBTAINED BY REACTION OF CITRIC ACID OR SALTS THEREOF WITH UREA AND FORMAMIDE
 1 Claim, No Drawings

[52] U.S. Cl. .................................................. 260/535 R,
 106/23, 106/287 R
[51] Int. Cl. .................................................. C07c 59/16
[50] Field of Search ........................................... 260/535

[56] References Cited
UNITED STATES PATENTS
2,095,457 10/1957 Steindorff.................... 260/535 X Primary Examiner—Lewis Gotts
Assistant Examiner—Paul J. Killos
Attorney—Johnston, Root, O'Keeffe, Keil, Thompson & Shurtleff ABSTRACT: Black pigment dyes obtained by reaction of citric acids or salts of citric acid with urea and formamide at from 100° to 250° C.

BLACK PIGMENT DYES OBTAINED BY REACTION OF CITRIC ACID OR SALTS THEREOF WITH UREA AND FORMAMIDE

This invention relates to black pigment dyes which are obtained by reaction of citric acid or citrates with urea and formamide at from 100° to 250° C.

These dyes, whose chemical constitution is not known, are valuable new pigments which are distinguished by high fastnesses. They are insoluble in water and most organic solvents. Their content of carbon, nitrogen and oxygen lies between the values C 40 to 50%; N 17 to 21%; O 28 to 36%. The new pigments may be prepared for example by reacting at temperatures of from 100° to 250° C. a mixture of a. citric acid or a citrate;
b. urea and
c. formamide, which in each case contains at least 5% by weight of one of the substances (a), (b) and (c) with reference to the total amount of the substances (a), (b) and (c). The temperature range of from 125° to 170° C. is preferred. The starting materials may be used in any proportions within the said limits.

The preferred weight ratio of urea to formamide is from 1:4 to 4:1 and that of citric acid or a citrate to urea and formamide is from 1:2 to 1:20.

Examples of salts of citric acid are those of the alkaline earth metals of alkali metals, such as calcium citrate or potassium citrate. The hydrate of citric acid or a concentrated aqueous solution may be used instead of anhydrous citric acid.

It is possible to add solvents such as acetic acid, glycol monomethyl ether or chlorobenzene. As a rule they do not bring any advantage, but they are not detrimental.

In some cases it is advantageous for the tinctorial properties of the pigments for the reaction to be carried out in the presence of up to 20% by weight, with reference to the total amount of the substances (a), (b) and (c), of an acid amide, amine or compound which under the conditions of the process is converted into an acid amide, and/or in the presence of up to 25% by weight, with reference to the total amount of the substances (a); (b) and (c); of a pigment diluent.

Examples of amides are sulfamide, acetamide, benzamide, oxamide and benzenesulfonamide, and of amines: guanidine, hexamethylenediamine and ethylenediamine. Examples of compounds which are converted into amides under the process conditions are adipic acid, adiponitrile, stearic acid, oxalic acid, tartaric acid, oxalic esters and terephthalic esters. Examples of pigment diluents are insoluble inorganic substances such as silica gel, barium sulfate and bleaching clay.

Reaction for the production of the new pigments is ended after about 30 minutes to 6 hours. The reaction is complete when the reaction mixture solidifies while becoming black in color. The dye is isolated by a conventional method, for example by suction filtration and washing with water or an organic solvent such as ethanol, acetone or toluene. In some cases it is advantageous for the isolation of finely divided dyes to add an organic solvent such as glycol monomethyl ether, acetone, toluene or glycol to the reaction mixture prior to cooling.

The new pigments are black powders having little or no solubility in water and organic solvents which are suitable for a great variety of applications in pigment technology because of their advantageous fastness properties such as light fastness, solvent fastness, overspraying fastness, overcoating fastness and migration fastness. Thus for example they are outstandingly suitable for the production of coating compositions and printing inks or for the mass coloration or spin dyeing of polymeric thermoplastic substances such as polyvinyl chloride, polystyrene, rubber, polyesters or polyamides.

The invention is illustrated by the following Examples. The parts specified in the Examples are parts by weight. Parts by volume bear the same relation to parts by weight as the liter to the kilogram.

EXAMPLE 1

A mixture of 525 parts of citric acid, 200 parts of urea and 300 parts of formamide is stirred for 2 hours at 155° C. 800 parts of glycol monomethyl ether is then added and the whole is suction filtered. The black residue is washed with methanol and dried. 300 parts of a black powdery pigment is obtained having the analytic values: C 45.9%; H 4.5%; O 30.3%; N 19.2%.

EXAMPLE 2

A mixture of 525 parts of citric acid, 300 parts of urea, 400 parts of formamide and 200 parts by volume of glacial acetic acid is heated (while distilling off the acetic acid) for 2 hours at 140° C. and 1 hour at 145° C. 800 parts of glycol monomethyl ether is added and the whole suction filtered. The residue is washed with methanol and 275 parts of a black powdery pigment is obtained having the analytical values: C 42.2%; H 4.5%; O 35.1%; N 18.7%.

EXAMPLE 3

The procedure of Example 1 is followed but 10 parts of stearic acid is added prior to heating. 310 parts of a black pigment is obtained having the analytical values: C 45.3%; H 4.4%; O 31.3%; N 19.0%.

EXAMPLE 4

1 part of the pigment prepared according to Example 1 is ground in 10 parts of linseed oil varnish on a three roll mill. The printing ink prepared in this way gives black prints having good light fastness when used in book printing. Similar results are achieved when using the pigments prepared according to Examples 2 and 3.

EXAMPLE 5

95 parts of a baking enamel mixture consisting of 67 parts of coconut oil resin, 17 parts of urea-formaldehyde resin and 16 parts of ethylene glycol are ground with 8 parts of the pigment prepared according to Example 1 in a cone mill. A black enamel is obtained which after having been baked into sheet metal, cardboard or aluminum foil, gives colors having very good fastness to light and overcoating. Similar results are obtained when using the pigments prepared according to Example 2 or 3.

EXAMPLE 6

A mixture of 70 parts of polyvinyl chloride, 30 parts of diisooctyl phthalate and 1 part of titanium oxide is colored in a conventional manner with 1.5 parts of the pigment described in Example 1 in a set of mixing rollers which has been heated to 160° C. A black composition is obtained from which for example sheeting or sections can be made. The color is distinguished by good fastness to plasticizers and to light. Similar results are obtained when using the pigments prepared according to Example 2 or 3.

EXAMPLE 7

300 parts of calcium citrate, 150 parts of urea, 300 parts of formamide and 100 parts of glacial acetic acid are mixed and stirred for 1 hour at 100° C., 1 hour at 130° C. and 4 hours at 150° C. The whole is then suction filtered while hot. The residue is washed with hot water and dried. 116 parts of a black pigment is obtained having the analytical values: C 42.2%; H 4.2%; O 31.6%; N 18.4%.

When the same amount of potassium citrate is used instead of calcium citrate, the same procedure being followed in other respects, a black pigment is obtained having the analytical values: C 44.1%; H 4.1%; O 32.1%; N 18.2%.

I claim:

1. A black pigment obtained by reacting, at a temperature of from 100° to 250° C., a mixture of:

a. citric acid or a citrate;

b. urea; and
c. formamide,
in which the ratio of urea to formamide is from 1:4 to 4:1 and that of citric acid or citrate to urea and formamide is from 1:2 to 1:20.